(12) United States Patent
Zhu et al.

(10) Patent No.: US 10,796,664 B2
(45) Date of Patent: Oct. 6, 2020

(54) DISPLAY MODULE AND PREPARATION METHOD, CONTROL METHOD AND CONTROL DEVICE, DISPLAY DEVICE

(71) Applicant: BOE TECHNOLOGY GROUP CO., LTD., Beijing (CN)

(72) Inventors: Wenxiu Zhu, Beijing (CN); Paoming Tsai, Beijing (CN)

(73) Assignee: BOE Technology Group, Co., Ltd., Beijing (CN)

( * ) Notice: Subject to any disclaimer, the term of this patent is extended or adjusted under 35 U.S.C. 154(b) by 0 days.

(21) Appl. No.: 16/380,075

(22) Filed: Apr. 10, 2019

(65) Prior Publication Data
US 2020/0035199 A1 Jan. 30, 2020

(30) Foreign Application Priority Data
Jul. 24, 2018 (CN) .......................... 2018 1 0818313

(51) Int. Cl.
*G09G 5/10* (2006.01)
*G06K 9/00* (2006.01)

(52) U.S. Cl.
CPC ............. *G09G 5/10* (2013.01); *G06K 9/0004* (2013.01); *G09G 2300/0439* (2013.01); *G09G 2320/0233* (2013.01); *G09G 2320/043* (2013.01); *G09G 2320/0626* (2013.01)

(58) Field of Classification Search
CPC ............. G09G 5/10; G09G 2300/0439; G09G 2320/0233; G09G 2320/043; G09G 2320/0626; G06K 9/0004; G06K 9/209; G06K 9/0012; H01L 27/3234
See application file for complete search history.

(56) References Cited

U.S. PATENT DOCUMENTS

| | | | | |
|---|---|---|---|---|
| 2017/0372110 A1* | 12/2017 | Uehara | ................... | G06F 3/041 |
| 2018/0033835 A1* | 2/2018 | Zeng | ..................... | G06F 3/0412 |
| 2018/0089491 A1* | 3/2018 | Kim | ................... | G06K 9/00912 |
| 2018/0121703 A1* | 5/2018 | Jung | ..................... | G06K 9/0004 |
| 2018/0129798 A1* | 5/2018 | He | ....................... | G06K 9/0002 |
| 2018/0247099 A1* | 8/2018 | Liu | ........................ | G06F 3/044 |
| 2018/0314873 A1* | 11/2018 | Yang | .................... | G06K 9/0002 |
| 2019/0073508 A1* | 3/2019 | Ling | ..................... | G06K 9/0004 |
| 2019/0114457 A1* | 4/2019 | Li | ...................... | G02F 1/133512 |

(Continued)

FOREIGN PATENT DOCUMENTS

| | | |
|---|---|---|
| CN | 105702176 A | 6/2016 |
| CN | 106095211 A | 11/2016 |

(Continued)

OTHER PUBLICATIONS

First Office Action for CN Appl. No. 201810818313.6, dated Apr. 30, 2020.

*Primary Examiner* — Tom V Sheng
(74) *Attorney, Agent, or Firm* — The Webb Law Firm

(57) ABSTRACT

The present disclosure provides a display module and a preparation method thereof, a control method and a control device, as well as a display device. The display module includes a display panel, comprising a fingerprint recognition area; an optical compensation layer on the light exiting side of the display panel, and a via in an area thereof opposite to the fingerprint recognition area; wherein the via is configured to transmit light emitted by the display panel.

18 Claims, 7 Drawing Sheets

(56) References Cited

U.S. PATENT DOCUMENTS

| | | | | |
|---|---|---|---|---|
| 2019/0197286 A1* | 6/2019 | Kim | .................... | H01L 27/3234 |
| 2019/0205603 A1* | 7/2019 | Lee | .................... | H01L 27/3272 |
| 2019/0220643 A1* | 7/2019 | Ling | .................... | H01L 27/3234 |
| 2019/0252645 A1* | 8/2019 | Kim | .................... | H01L 51/5253 |
| 2019/0362672 A1* | 11/2019 | Cui | .................... | H01L 27/3234 |

FOREIGN PATENT DOCUMENTS

| | | |
|---|---|---|
| CN | 206193837 U | 5/2017 |
| CN | 107102693 A | 8/2017 |
| CN | 107239752 A | 10/2017 |
| EP | 2 910 030 B1 | 8/2015 |
| WO | WO-2011/037050 A1 | 3/2011 |

\* cited by examiner

DISPLAY MODULE AND PREPARATION METHOD, CONTROL METHOD AND CONTROL DEVICE, DISPLAY DEVICE

CROSS-REFERENCE TO RELATED APPLICATIONS

The present application is based on and claims priority to CN Application No. 201810818313.6, filed on Jul. 24, 2018, the disclosed content of which is hereby incorporated in the present application in its entirety.

TECHNICAL FIELD

The present disclosure relates to the technical field of display, and in particular, to a display module and a preparation method thereof, a control method and a control device, as well as a display device.

BACKGROUND

In the related art of in-screen fingerprint recognition, an optical sensor is disposed under a display panel, and a light shielding layer having imaging holes is disposed in the display panel, thereby realizing in-screen fingerprint recognition by using the pinhole imaging principle. This fingerprint recognition method can effectively reduce the size of the screen frame and help to achieve full-screen of the screen.

SUMMARY

According to one aspect of the embodiments of this disclosure, a display module is provided. The display module comprises: a display panel, comprising a fingerprint recognition area, an optical compensation layer on the light exiting side of the display panel and a via in an area thereof opposite to the fingerprint recognition area, wherein the via is configured to transmit light emitted by the display panel.

In some embodiments, further comprises a transparent material, wherein the transparent material is in the via, and a light transmittance of the transparent material is greater than that of the optical compensation layer.

In some embodiments, the transparent material includes an acryl-based material.

In some embodiments, the number of pixels corresponding to the via is from 4 to 24.

In some embodiments, a distance between adjacent vias is from 400 to 1200 microns.

In some embodiments, the optical compensation layer is a quarter wave plate.

In some embodiments, there is also a polarizing layer disposed between the display panel and the optical compensation layer.

In some embodiments, the polarizing layer is a circular polarizing layer.

In some embodiments, a central axis of an imaging hole in the display panel passes through a corresponding via.

In some embodiments, the central axis of the imaging hole coincides with a central axis of the corresponding via.

According to a second aspect of the embodiments of the present disclosure, a display device is provided. The display device includes a display module according to any of the aforementioned embodiments.

According to a third aspect of the embodiments of this disclosure, a preparation method of a display module is provided. The preparation method comprises: forming a transparent material layer on a display panel; patterning the transparent material layer to form an opening exposing pixels in the display panel other than pixels that emit light during fingerprint recognition; forming an optical compensation layer on the transparent material layer.

In some embodiments, forming a transparent material layer on the display panel includes: forming a hard coating on the display panel; forming the transparent material layer on the hard coating; removing the hard coating.

In some embodiments, a light transmittance of the transparent material is greater than that of the optical compensation layer.

In some embodiments, the transparent material includes an acryl-based material.

According to a fourth aspect of the present disclosure, there is provided a method of controlling a display module according to any of the above embodiments, comprising: monitoring a display state of the display panel; reducing the illumination brightness of the pixels that emit light in the fingerprint recognition process in the display panel in the case where the display panel performs display, so that the pixels in the display panel have the same display brightness.

According to a fifth aspect of the present disclosure, there is provided a control device of a display module which is the display module according to any of the above embodiments, comprising: a monitoring module configured to monitor a display state of the display panel; a brightness adjustment module configured to reduce the brightness of the pixels that emit light in the fingerprint recognition process in the display panel in the case where the display panel performs display, so that the pixels in the display panel have the same display brightness.

According to a sixth aspect of embodiment of the present disclosure, there is provided a control device of a display module, comprising: a memory configured to store commands; and a processor coupled to the memory and configured to execute the method according any of the aforementioned embodiments based on the commands stored in the memory.

According to a seventh aspect of the embodiment of the present disclosure, there is provided a computer readable storage medium for storing a computer command that implements the method according any of the above embodiments when executed by the processor.

Further features of the present disclosure, as well as advantages thereof, will become clearer from the following detailed description of exemplary embodiments of the present disclosure with reference to the accompanying drawings.

BRIEF DESCRIPTION OF THE DRAWINGS

The accompanying drawings, which constitute a part of the specification, illustrate embodiments of the present disclosure and, together with the description, serve to explain the principles of the present disclosure.

The present disclosure may be understood more clearly from the following detailed description with reference to the accompanying drawings, wherein.

Figure 1:
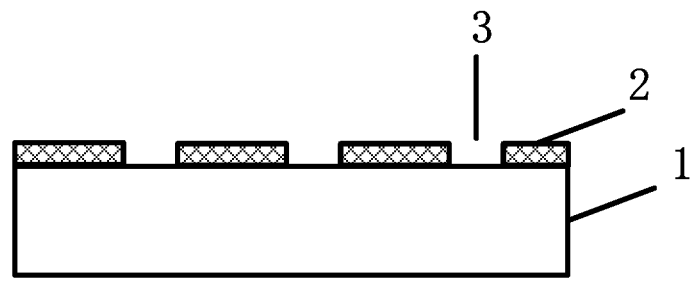
FIG. 1 is a structural diagram of a display module according to one embodiment of the present disclosure.

It should be understood that the dimensions of the various parts shown in the drawings are not drawn according to the actual proportional relationship. In addition, the same or similar reference signs denote the same or similar components.

DETAILED DESCRIPTION OF THE EMBODIMENTS

The exemplary embodiments of the present disclosure will be described in detail with reference to the accompanying drawings. The description of the exemplary embodiments is intended to be merely illustrative, and is not meant to be limitation on the present disclosure and its application or use in any way. The present disclosure may be implemented in many different forms, not limited to the embodiments described herein. These embodiments are provided so that this disclosure will be thorough and complete, and will fully convey the scope of the disclosure to those skilled in the art. It should be noted that, unless otherwise specified, relative arrangement of components and steps, ingredients of the materials, numerical expressions and numerical values set forth in these embodiments are to be construed as merely illustrative, not as a limitation.

Similar words like "include" or "comprise" mean that the element that precedes the word covers the elements listed after that term, but does not exclude the possibility of also covering other elements.

Unless otherwise specifically defined, all terms (including technical terms or scientific terms) used in the present disclosure have the same meanings as understood by an ordinary person skilled in the art to which the present disclosure belong. It will also be understood that terms defined in, for example, common dictionaries should be interpreted as having meanings that are consistent with their meanings in the context of the relevant art, and should not be interpreted in an idealized or extremely formal sense unless expressly defined here.

Techniques, methods, and devices known to an ordinary person skilled in the relevant art may not be discussed in detail but, where appropriate, such techniques, methods, and devices are to be considered part of the description.

The inventors have found through research that in the related art, a reflected light received by a fingerprint sensor needs to have a certain brightness, so that a illumination brightness of the pixels in the fingerprint recognition area is improved, such that the life of the pixels will be reduce.

To this end, the present disclosure proposes a solution for extending the life of the pixels.

FIG. 1 is a structural diagram of a display module according to one embodiment of the present disclosure.

Figure 4:
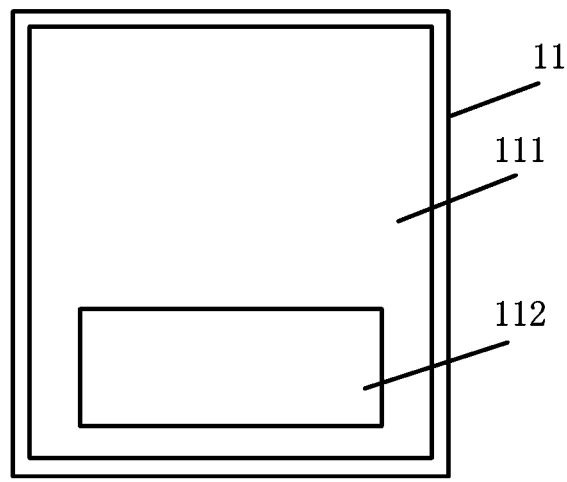
FIG. 4 is a top view showing a display module according to an embodiment of the present disclosure.

As shown in FIG. 1, the display module includes a display panel 1 and an optical compensation layer 2. A fingerprint recognition area is provided in the display panel 1 (as shown in FIG. 4). The optical compensation layer 2 is disposed on a light exiting side of the display panel 1. The optical compensation layer 2 is provided with a via 3 in an area opposite to the fingerprint recognition area, the via 3 is configured to transmit light emitted by the display panel 1.

In the display module provided by the above embodiment of the present disclosure, the optical compensation layer is provided with the via in a area opposite to the pixels that emit light during the fingerprint recognition process, the light emitted by the pixels that emit light during the fingerprint recognition process can pass directly through the via during light propagation without passing through the optical compensation layer, thereby effectively avoiding the energy loss caused by the light passing through the optical compensation layer. Therefore, the fingerprint sensor can work normally and the life of the pixels are prolonged without increasing the illumination brightness of the light emitting pixels in the fingerprint recognition process.

Figure 2:
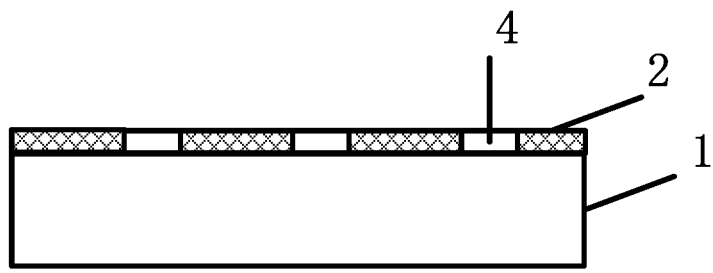
FIG. 2 is a structural diagram of a display module according to another embodiment of the present disclosure.

FIG. 2 is a structural diagram of a display module according to another embodiment of the present disclosure. FIG. 2 differs from FIG. 1 in that, in the embodiment shown in FIG. 2, a transparent material 4 is provided in the via 3, and a light transmittance of the transparent material 4 is greater than that of the optical compensation layer 2.

By providing a transparent material in the via, the loss of light in the process of passing through the transparent material can be reduced, and the surface of the display panel can be protected. In some embodiments, the transparent material comprises an acryl-based material, or other material capable of providing high light transmittance.

In some embodiments, the optical compensation layer 2 is a quarter wave plate. Since the quarter wave plate can convert circularly polarized light into linearly polarized light, it effectively avoids the rainbow pattern that occurs in the display module.

Figure 3:
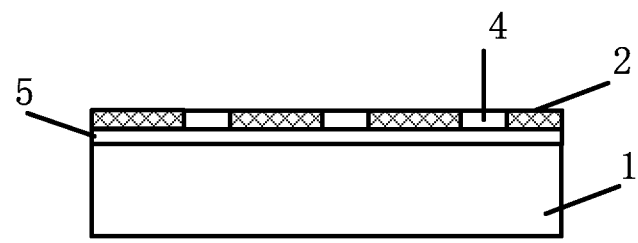
FIG. 3 is a structural diagram of a display module according to still another embodiment of the present disclosure.

FIG. 3 is a structural diagram of a display module according to still another embodiment of the present disclosure. FIG. 3 differs from FIG. 2 in that, in the embodiment shown in FIG. 3, the display module also includes a polarizing layer 5. The polarizing layer is disposed between the display panel 1 and the optical compensation layer 2.

By disposing the polarizing layer 5 between the display panel 1 and the optical compensation layer 2, interference of external ambient light on the display panel can be effectively avoided. In some embodiments, the polarizing layer 5 is a circular polarizing layer.

FIG. 4 is a top view of a display module according to one embodiment of the present disclosure.

As shown in FIG. 4, a display area 111 is provided in a display screen 11 of the display module 4. A fingerprint recognition area 112 is also provided in the display area 111. The pixels that emit light during the fingerprint recognition process is located in the fingerprint recognition area 112. It should be noted that the pixels that emit light during the fingerprint recognition process also participate in normal display of the display module 4.

In some embodiments, a size and a position of the fingerprint recognition area 112 may be set as needed. For example, the fingerprint recognition area 112 may be provided on one side of the display screen for the convenience of the user's fingerprint recognition operation. In other embodiments, the fingerprint recognition area 112 may cover the whole display area 111.

Figure 5:
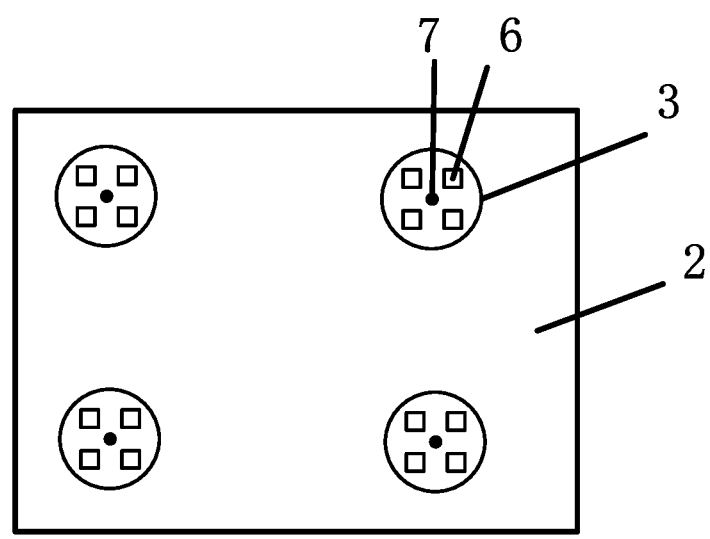
FIG. 5 is a top view of a display module according to another embodiment of the present disclosure.

FIG. 5 is a top view of a display module according to another embodiment of the present disclosure.

As shown in FIG. 5, a via 3 is formed in the optical compensation layer 2, so that light emitted by the pixel 6 that emits light during fingerprint recognition can pass directly through the via 3, thereby effectively reducing the loss of light emitted by the pixel 6 during propagation. For other pixels on the display panel, the emitted light needs to pass through the light compensation layer 2. For the sake of simplicity, these pixels are not shown in FIG. 5.

In some embodiments, the number of pixels corresponding to the via 3 is from 4 to 24. In this way, light leakage caused by excessive opening of the via can also be avoided while the fingerprint identification requirements are met. For example, in the embodiment shown in FIG. 5, each via 3 corresponds to four pixels that emit light during fingerprint recognition.

In some embodiments, the distance between adjacent vias is from 400 to 1200 microns. In the optical compensation layer 2, the requirement of fingerprint recognition can be satisfied as long as a via is opened every 8 to 24 pixels. Therefore, the distance between the vias can be set according to the size of each pixel to meet the fingerprint identification requirements. In some embodiments, the range of distance between adjacent vias is 800 microns.

In some embodiments, the central axis of the imaging hole 7 passes through the corresponding via so that the light passing through the via 3 passes through the imaging hole 7 as much as possible to reach the fingerprint sensor. In other embodiments, the central axis of the imaging hole 7 coincides with a central axis of the corresponding via.

Figure 6:
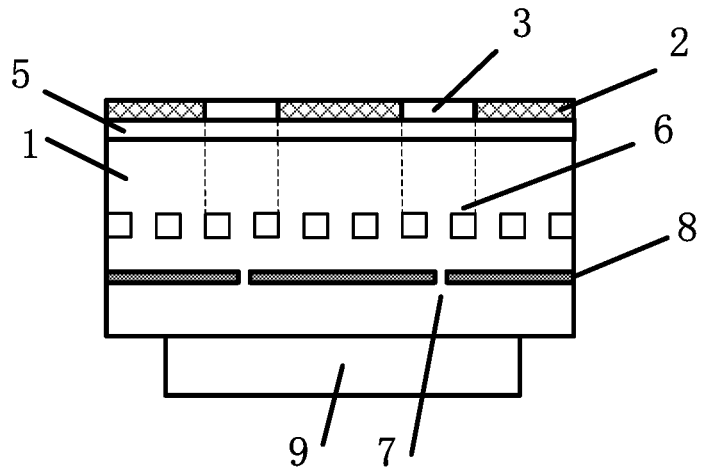
FIG. 6 is a sectional view of a display module according to one embodiment of the present disclosure.

FIG. 6 is a sectional view of a display module according to one embodiment of the present disclosure.

As shown in FIG. 6, the optical compensation layer 2 is disposed on the light exiting side of the display panel 1, and the polarizing layer 5 is disposed between the optical compensation layer 2 and the display panel 1. The optical compensation layer 2 is provided with a via 3 in an area opposite to the fingerprint recognition area, and the light emitted by the pixel 6 illuminated during the fingerprint recognition process can pass through the via 3 directly. A light shielding layer 8 is disposed in the display panel 1, and the imaging hole 7 is formed on the light shielding layer 8 to implement pinhole imaging. The central axis of the imaging hole 7 passes through the corresponding via 3.

For example, the light emitted by the pixel 6 that emits light during the fingerprint recognition process is illuminated on the human finger through the via 3 and reflected by the finger, and reaches the fingerprint sensor 9 through the imaging hole 7, and the fingerprint sensor 9 performs the fingerprint recognition process. Since the light emitted by the pixel 6 that emits light during the fingerprint recognition process can directly pass through the via 3 during propagation, and does not pass through the optical compensation layer 2, energy loss caused by the light passing through the optical compensation layer is effectively avoided. Therefore, the fingerprint sensor can work normally and the life of the pixels are prolonged without increasing the illumination brightness of the light emitting pixels.

The embodiment of the present disclosure also provides a display device comprising any of the aforementioned display modules. The display device may be any product or component having a display function such as LCD (Liquid Crystal Display), LED (Light Emitting Diode), display, OLED (Organic Light Emitting Diode), QLED (Quantum Dot Light Emitting Diode), mobile phone, tablet computer, television, notebook computer, digital photo frame, navigator, etc.

Figure 7:
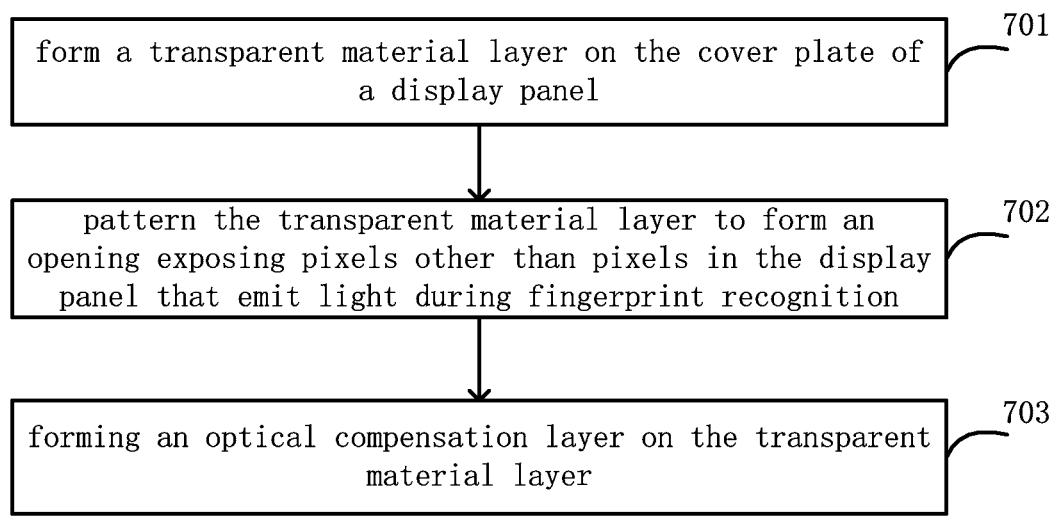
FIG. 7 is a flow chart of a manufacturing method of the display module according to one embodiment of the present disclosure.

FIG. 7 is a flow chart of a manufacturing method of the display module according to one embodiment of the present disclosure.

In step 701, a transparent material layer is formed on a display panel.

In step 702, the transparent material layer is patterned to form an opening exposing pixels in the display panel other than pixels that emit light during fingerprint recognition.

In step 703, forming an optical compensation layer on the transparent material layer. In some embodiments, an optical compensation material is coated on the transparent material layer to obtain an optical compensation layer.

In some embodiments, the light transmittance of the transparent material is greater than that of the optical compensation layer. In this way, the loss of light in the process of passing through the transparent material can be reduced.

In the manufacturing method of the display module provided by the above embodiment of the present disclosure, the optical compensation layer is provided with via in an area opposite to the pixels that emit light during the fingerprint recognition process, the light emitted by the pixels that emit light during the fingerprint recognition process can pass directly through the via during light propagation without passing through the optical compensation layer, thereby effectively avoiding the energy loss caused by the light passing through the optical compensation layer. Therefore, the fingerprint sensor can work normally and the life of the pixels are prolonged without increasing the illumination brightness of the light emitting pixels in the fingerprint recognition process.

Figure 8A:
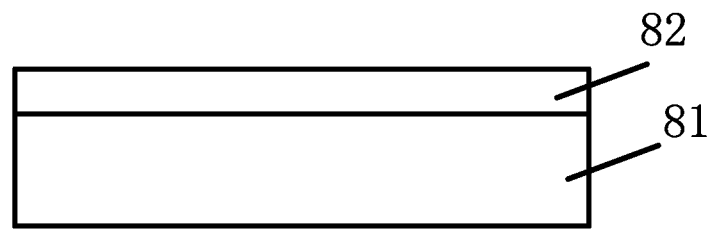
FIGS. 8A-8C are sectional views of a structure in several stages of the display module manufacturing method according to some embodiments of the present disclosure.
Figure 8B:
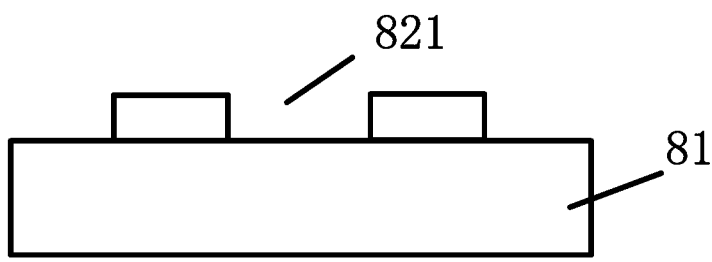
Figure 8C:
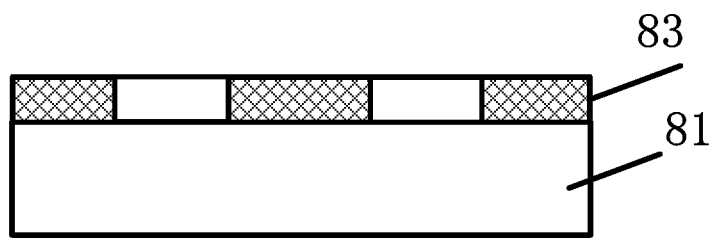

FIGS. 8A-8C are sectional views of a structure in several stages of the display module manufacturing method according to some embodiments of the present disclosure.

First, as shown in FIG. 8A, a transparent material layer 82 is formed on the display panel 81.

In some embodiments, the transparent material layer includes an acryl-based material.

Next, as shown in FIG. 8B, the transparent material layer 82 is patterned to form an opening 821 exposing pixels in the display panel other than pixels that emit light during fingerprint recognition.

Thereafter, as shown in FIG. 8C, coating is performed on the transparent material layer 82 with an optical compensation material to obtain an optical compensation layer 83.

Accordingly, in the obtained optical compensation layer 83, the area opposite to the pixels that emit light during fingerprint recognition is made of a transparent material. Thus, the light emitted by the pixels that are illuminated during the fingerprint recognition process is transmitted through the transparent material, thereby effectively avoiding the energy loss caused by the light passing through the optical compensation layer. Therefore, the fingerprint sensor can work normally and the life of the pixels are prolonged without increasing the illumination brightness of the light emitting pixels in the fingerprint recognition process.

FIGS. 9A-9E are sectional views of a structure in several stages of the display module manufacturing method according to other embodiments of the present disclosure.

Figure 9A:
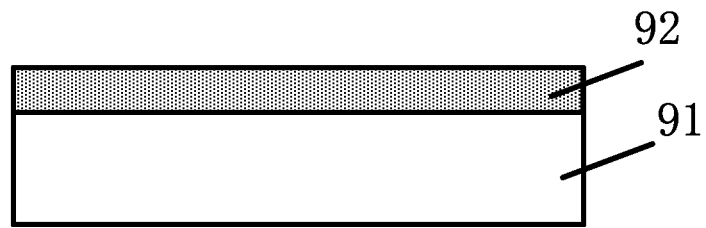
FIGS. 9A-9E are sectional views of a structure in several stages of the display module manufacturing method according to other embodiments of the present disclosure.

First, as shown in FIG. 9A, a hard coating 92 is formed on a display panel 91.

In some embodiments, the hard coating is made of an epoxy-based material or other material capable of protecting the display panel.

Figure 9B:
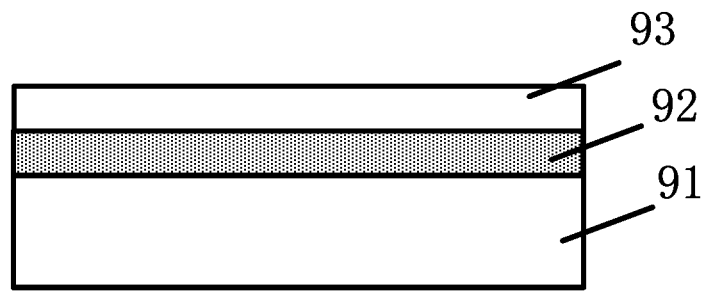

Next, as shown in FIG. 9B, a transparent material layer 93 is formed on the hard coating 92.

In some embodiments, the transparent material layer includes an acryl-based material.

Figure 9C:
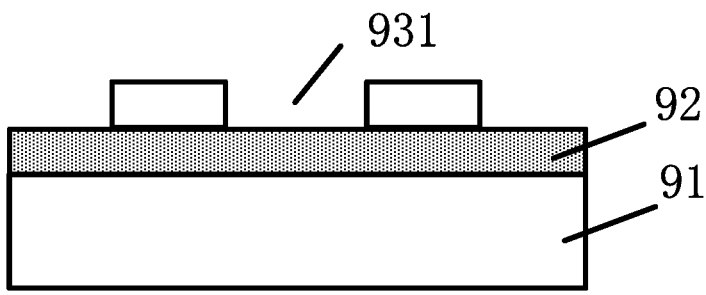

Next, as shown in FIG. 9C, the transparent material layer 93 is patterned to form an opening 931 exposing pixels in the display panel other than pixels that emit light during fingerprint recognition.

Figure 9D:
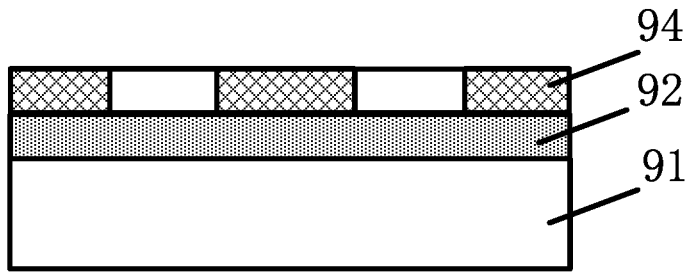

Thereafter, as shown in FIG. 9D, the optical compensation material is coated on the transparent material layer 93 to obtain an optical compensation layer 94.

Figure 9E:
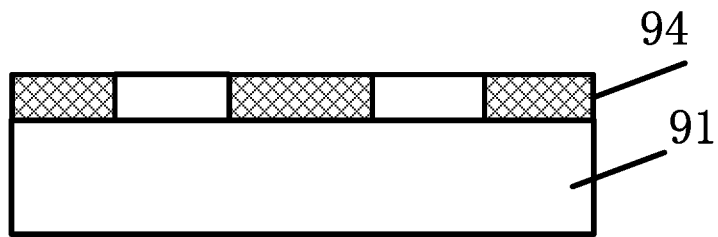

Next, as shown in FIG. 9E, the hard coating 92 is removed. In some embodiments, by peeling off the optical compensation layer 94, the hard coating 92 is removed by laser, and the optical compensation layer 94 is attached to the display panel 91.

For flexible display, the cover plate of the display panel is a flexible film. To protect the flexible film, the hard coating 92 is firstly formed on the flexible film, and then the optical compensation layer 94 is formed on the hard coating 92. After the optical compensation layer 94 is formed, the hard coating 92 is removed, and the optical compensation layer 94 is attached to the flexible film to obtain a flexible display panel.

Figure 10:
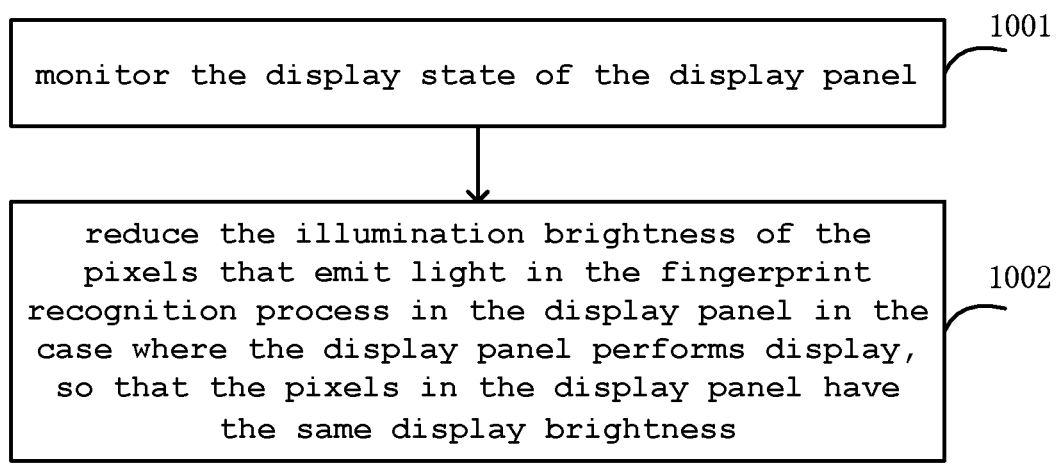
FIG. 10 is a flow chart of a method of controlling the display module according to one embodiment of the present disclosure.

FIG. 10 is a flow chart of a method of controlling the display module according to one embodiment of the present disclosure. The display module may be a display module in any of the embodiments in FIG. 1 to FIG. 6.

In step 1001, the display state of the display panel is monitored.

In step 1002, the illumination brightness of the pixels that are illuminated in the display panel in the fingerprint recognition process is lowered in the case where the display panel performs display, so that the pixels in the display panel have the same display brightness.

In order to ensure a more uniform display brightness when the display panel performs display, the brightness of the pixels can be adjusted in a compensation manner. For example, when the display panel displays a white screen of 255-gray, the brightness is 400 nit. For those pixels that emit light during fingerprint recognition, the brightness of the corresponding area is 420 nit. By using the following formula (1), the grayscale of the pixels that emit light during the fingerprint recognition process is reduced from 255 to 249, thereby ensuring uniform display brightness of the entire display area. In the formula (1), $L_{255}$ is the original grayscale, and the value here is 255. $L_{gray}$ is the adjusted grayscale, and the value here is 249. Gray is the adjusted pixel brightness.

$$L_{gray} = \left(\frac{\text{Gray}}{255}\right)^{2.2} \times L_{255} \quad (1)$$

By using the above formula, the brightness of the pixels that emit light during the fingerprint recognition process can be adjusted. Therefore, when the display panel performs display, uniform display brightness of the entire display area can be ensured.

Figure 11:
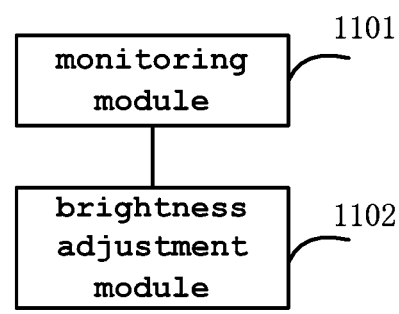
FIG. 11 is a structural diagram of a control device of the display module according to one embodiment of the present disclosure.

FIG. 11 is a structural diagram of a control device of the display module according to one embodiment of the present disclosure. As shown in FIG. 11, the control device includes a monitoring module 1101 and a brightness adjustment module 1102.

The monitoring module 1101 is configured to monitor a display state of the display panel.

The brightness adjustment module 1102 is configured to lower the illumination brightness of the pixels that are illuminated in the display panel in the fingerprint recognition process in the case where the display panel performs display, so that the pixels in the display panel have the same display brightness.

In some embodiments, the monitoring module 1101 determines whether the display panel performs display by monitoring the respective drive signals and controls signals of different pixels.

In some embodiments, the brightness adjustment module 1102 adjusts the illumination brightness of the pixels that emit light during fingerprint recognition by using the above formula (1), so that the pixels in the display panel have the same display brightness.

In some embodiments, the aforementioned modules may be implemented as a general purpose processor, a programmable logic controller (PLC for short), a digital signal processor (DSP for short), an application specific integrated circuit (ASIC for short), a field-programmable gate array (FPGA for short) or other programmable logic devices, discrete gates or transistor logics, discrete hardware components or any suitable combination thereof for performing the functions described in the present disclosure.

Figure 12:
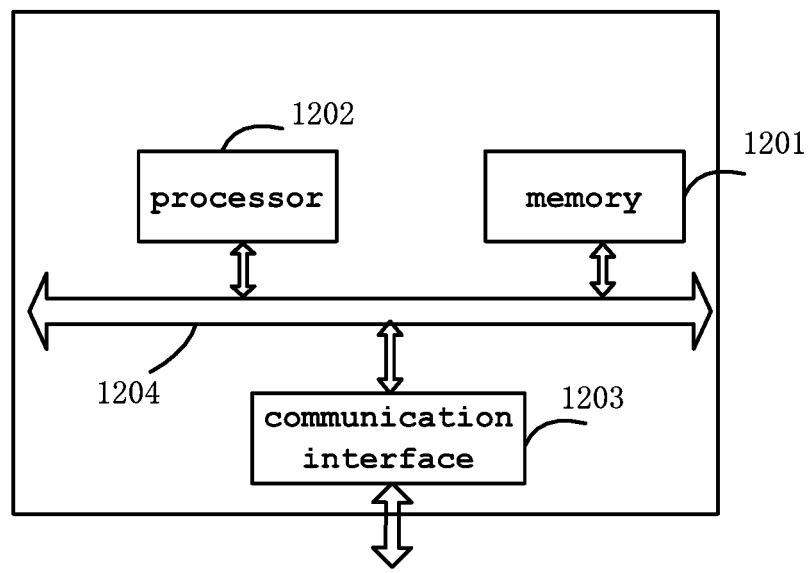
FIG. 12 is a structural diagram of a control device of a display module according to another embodiment of the present disclosure.

FIG. 12 is a structural diagram of a control device of the display module according to another embodiment of the present disclosure. As shown in FIG. 12, the control device of the display module includes a memory 1201 and a processor 1202.

The memory 1201 is used for storing commands. The processor 1202 is coupled to the memory 1201. The processor 1202 is configured to execute the method according any of the aforementioned embodiments as shown in FIG. 10 based on the commands stored in the memory.

As shown in FIG. 12, the control device of the display module also includes a communication interface 1203 for performing information interaction with other devices. Meanwhile, the device also includes a bus 1204, so that the processor 1202, the communication interface 1203 and the memory 1201 perform communication with each other via the bus 1204.

The memory 1201 may include a high speed RAM (Random Access Memory), and may also include an NVM (Non-Volatile Memory). For example, at least one disk storage. The memory 91 may also be a memory array. The memory 1201 may also be partitioned into blocks, which may be combined into virtual volumes according to certain rules.

In addition, the processor 1202 may be a central processing unit, or may be an ASIC (Application Specific Integrated Circuit), or one or more integrated circuits configured to implement the embodiments of the present disclosure.

The present disclosure also provides a computer readable storage medium. The computer readable storage medium stores computer commands that implement the method according to any of the above embodiments shown in FIG. 10 when executed by the processor.

Up to this point, the embodiments of the present disclosure have been described in detail. In order to avoid obscuring the concepts of the present disclosure, some details known in the art are not described. Those skilled in the art can totally understand how to implement the technical solution disclosed here according to the above description.

Although some specified embodiments of the present disclosure have been explained in detail by the examples, those skilled in the art shall understand that the above examples are only intended for making explanation rather than for limiting the scope of the present disclosure. Those skilled in the art shall understand that the above embodiments can be amended or equivalent substation of part of the technical features can be performed without deviating from the scope and spirit of the present disclosure. The scope of the present disclosure is defined by the following claims.

What is claimed is:

1. A display module, comprising:
a display panel, comprising a fingerprint recognition area;
an optical compensation layer on a light exiting side of the display panel, and a via in an area thereof opposite to the fingerprint recognition area, wherein the optical compensation layer is a quarter wave plate;
wherein the via is configured to transmit light emitted by the display panel.

2. The display module according to claim 1, further comprising a transparent material, wherein the transparent material is in the via, and a light transmittance of the transparent material is greater than that of the optical compensation layer.

3. The display module according to claim 2, wherein the transparent material includes an acryl-based material.

4. The display module according to claim 1, wherein a number of pixels corresponding to the via is from 4 to 24.

5. The display module according to claim 1, wherein a distance between adjacent vias ranges is from 400 to 1200 microns.

6. The display module according to claim 1, further comprising:
a polarizing layer disposed between the display panel and the optical compensation layer.

7. The display module according to claim 6, wherein the polarizing layer is a circular polarizing layer.

8. The display module according to claim 1, wherein a central axis of an imaging hole in the display panel passes through a corresponding via.

9. The display module according to claim 8, wherein the central axis of the imaging hole coincides with a central axis of the corresponding via.

10. A display device, comprising: the display module according to claim 1.

11. A control device of the display module according to claim 1, comprising:
a monitoring module configured to monitor a display state of the display panel;
a brightness adjustment module configured to reduce a brightness of pixels that emit light in a fingerprint recognition process in the display panel where the display panel performs display, so that the pixels in the display panel have the same display brightness.

12. A method of manufacturing a display module, comprising:
forming a transparent material layer on a display panel;
patterning the transparent material layer to form an opening exposing pixels in the display panel other than pixels that emit light during fingerprint recognition;
forming an optical compensation layer on the transparent material layer, wherein the optical compensation layer is a quarter wave plate.

13. The manufacturing method according to claim 12, wherein forming a transparent material layer on the display panel includes:
forming a hard coating on the display panel;
forming the transparent material layer on the hard coating;
removing the hard coating.

14. The manufacturing method according to claim 12, wherein a light transmittance of the transparent material layer is greater than that of the optical compensation layer.

15. The manufacturing method according to claim 14, wherein the transparent material layer includes an acryl-based material.

16. A method of controlling a display module, wherein the display module comprises a display panel, comprising a fingerprint recognition area; an optical compensation layer on a light exiting side of the display panel, and a via in an area thereof opposite to the fingerprint recognition area; wherein the via is configured to transmit light emitted by the display panel, the optical compensation layer is a quarter wave plate, the method comprising:
monitoring a display state of the display panel;
reducing an illumination brightness of pixels that emit light in a fingerprint recognition process in the display panel where the display panel performs display, so that pixels in the display panel have the same display brightness.

17. A control device of a display module, comprising:
a memory configured to store commands;
a processor coupled to the memory and configured to implement the method according to claim 16 based on the commands stored in the memory.

18. A non-transitory computer readable storage medium which stores computer commands that execute the method according to claim 16 when executed by a processor.

* * * * *